United States Patent [19]

Kihara et al.

[11] 4,294,933

[45] Oct. 13, 1981

[54] PROCESS FOR THE PRODUCTION OF AN ION EXCHANGE MEMBRANE

[75] Inventors: Kunio Kihara; Hideo Toda, both of Ami; Eiki Yasukawa, Tsuchiura; Toshiaki Ishibashi, Ami; Taketoshi Tokita, Tsuchiura, all of Japan

[73] Assignee: Mitsubishi Petrochemical Company Limited, Tokyo, Japan

[21] Appl. No.: 54,883

[22] Filed: Jul. 5, 1979

[30] Foreign Application Priority Data

Jul. 13, 1978 [JP] Japan .................................. 53-84590

[51] Int. Cl.³ .......................................... C25B 13/00
[52] U.S. Cl. ........................................ 521/27; 521/28
[58] Field of Search .................................... 521/27, 28

[56] References Cited

U.S. PATENT DOCUMENTS

| | | | |
|---|---|---|---|
| 2,865,884 | 12/1958 | DeBenneville | 521/25 |
| 3,446,726 | 5/1969 | Pungor et al. | 521/27 |
| 3,627,703 | 12/1971 | Kojima et al. | 521/28 |
| 3,876,565 | 4/1975 | Takashima et al. | 521/28 |

Primary Examiner—Joseph L. Schofer
Assistant Examiner—Peter F. Kulkosky
Attorney, Agent, or Firm—Wenderoth, Lind & Ponack

[57] ABSTRACT

In the production of a heterogeneous ion exchange membrane in which an ion exchange resin fine powder is dispersed in a thermoplastic resin, a silane-modified polyolefin resin and ion exchange resin fine powder are kneaded, extruded to form a membrane and then subjected to a treatment with hot water, thus obtaining an ion exchange membrane having a high ion transport number in a high ion concentration and a low specific resistance in an aqueous solution of a polyvalent ion salt, which is well balanced.

26 Claims, 2 Drawing Figures

PROCESS FOR THE PRODUCTION OF AN ION EXCHANGE MEMBRANE

BACKGROUND OF THE INVENTION

1. Field of the Invention

This invention relates to a process for the production of an ion exchange membrane and more particularly, it is connected with a process for producing a heterogeneous ion exchange membrane having a more improved ion transport number in a high ion concentration as well as a more improved specific resistance in an aqueous polyvalent ionic salt solution then the heterogeneous ion exchange membrane of the prior art.

2. Description of the Prior Art

An ion exchange membrane comprising an ion exchange resin attached to a support of synthetic resin screen has been put to practical use as a semi-homogeneous membrane, but there are various limitations in the practical use thereof. That is to say, this semi-homogeneous ion exchange membrane shows a remarkably different degree in swelling when it is dipped of aqueous solutions and shrinkage when it is natrually dried in the air, whereby the membrane becomes deformed and cracked and cannot be put to practical use. Therefore, the ion exchange membrane is stored in a wet state, which necessity is a bar to practical use thereof. In addition, since such an ion exchange membrane generally lacks flexibility, there are some difficulties when using this ion exchange membrane in an electrodialysis apparatus.

For the purpose of solving these problems, it has hitherto been proposed to prepare a heterogeneous ion exchange membrane by mixing a finely powdered ion exchange material with a polyolefin as a matrix, molding the mixture and subjecting it to a post-treatment using hot water. For example, there are a method comprising kneading an ion exchange resin with polypropylene, shaping the mixture in the form of a film and treating with an acid and alkali (U.S. Pat. No. 3,627,703) and a method comprising treating a formed film with hot water (U.S. Pat. No. 3,876,565).

However, the heterogeneous ion exchange membranes prepared by these methods can be put to practical use with some advantages in the desalting of an aqueous solution having a relatively low ion concentration, but are not very satisfactory in the desalting of an aqueous solution having a relatively high concentration. That is, in an aqueous solution having a high ion concentration, the heterogeneous ion exchange membrane prepared by the above described method shows an adequately low specific resistance, but has at the same time a disadvantage that the ion transport number is considerably lowered. In the heterogeneous ion exchange membranes, microcracks are formed due to swelling of the ion exchange membrane during the post-treatment with hot water, which is a control factor of the ion exchange membrane. When using an ordinary crystalline thermoplastic resin as a matrix, stress concentration points tend to occur in the inner part against the swelling pressure because of little molecular chains becoming entangled with each other and large microcracks are thus formed. It is assumed that the water contained therein with a high ion concentration lowers the ion transport number.

In a process for the production of a heterogeneous ion exchange membrane having a high ion transport number in a high ion concentration, therefore, it is essential to decrease the diameters of microcracks. To this end, it is considered to decrease the diameters of microcracks and to raise the ion transport number by increasing the degree of cross linking of the ion exchange resin and decreasing the degree of swelling of the ion exchange resin. However, this method has a disadvantage that the specific resistance is increased although the ion transport number is increased and the durability, e.g. chemical stability, is improved.

The inventors have hitherto made various efforts to overcome these disadvantages of the prior art and consequently, have invented a process for the production of a heterogeneous ion exchange membrane which ion transport number is not lowered in a high ion concentration, which process comprises kneading a finely powdered ion exchange material with a bridge-making and film-making polymer, heating and pressing the resultant mixture to form a film, simultaneously or thereafter bridging the above described polymer and then subjecting the formed film to a treatment with hot water (Japanese patent application (OPI) No. 88678/1978).

SUMMARY OF THE INVENTION

It is an object of the present invention to provide an improved process for the production of a heterogeneous ion exchange membrane.

It is another object of the present invention to provide a process for producing a heterogeneous ion exchange membrane whose ion transport number in a high ion concentration and specific resistance in an aqueous solution of a polyvalent ionic salt are markedly improved.

It is a further object of the invention to provide a heterogeneous ion exchange membrane suitable for desalting an aqueous solution containing a number of polyvalent ions.

These objects can be attached by a process for the production of an ion exchange membrane, which comprises, in the production of a heterogeneous ion exchange membrane in which an ion exchange resin fine powder is dispersed in a thermoplastic resin, kneading a silane-modified polyolefin resin and ion exchange resin fine powder, preferably forming the resulting mixture into pellets, extruding to form a film and then subjecting the resulting film to a treatment with hot water.

BRIEF DESCRIPTION OF THE DRAWING

The accompanying drawings are to illustrate the principle and merits of the present invention in more detail.

DETAILED DESCRIPTION OF THE INVENTION

Figure 1:
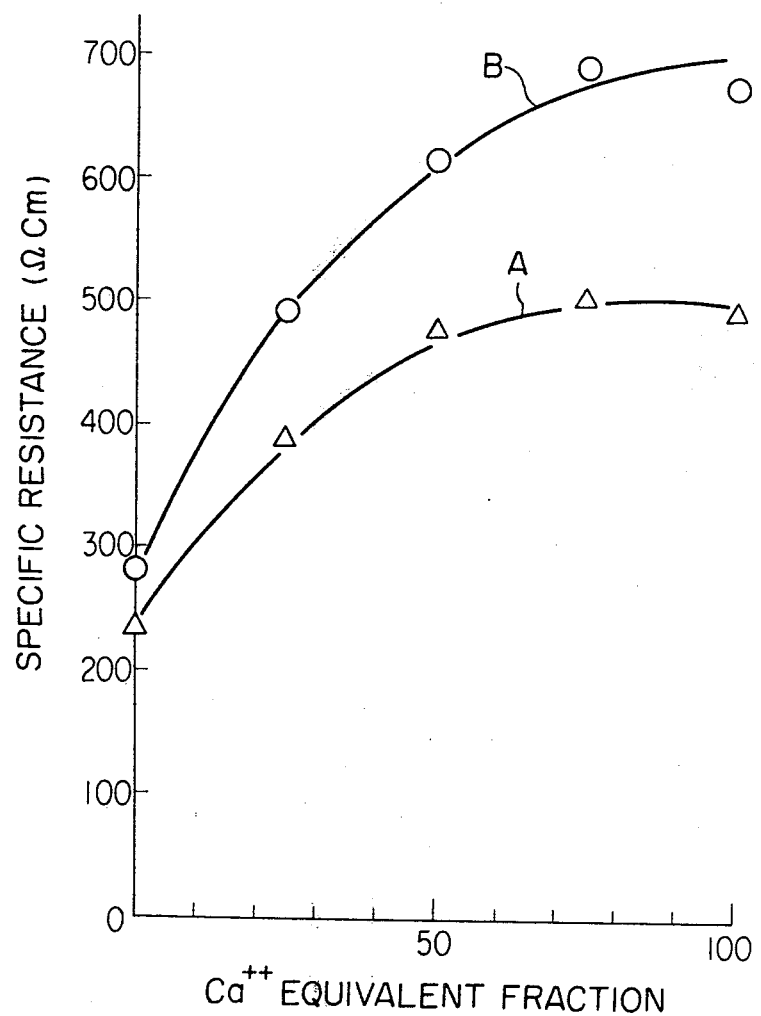
FIG. 1 and FIG. 2 show graphically the specific resitances of ion exchange membranes of the present invention and the prior art in aqueous solutions of polyvalent ionic salts.

The inventors have made further studies on a process for the production of a heterogeneous ion exchange membrane having a high ion transport number in a high ion concentration and a low specific resistance in an aqueous solution of a polyvalent ion salt and consequently, have found that more excellent results can be obtained by carrying out post-bridging of a matrix polymer by siloxane linkages, leading to the present invention.

That is to say, in accordance with the present invention, there is provided a process for the production of a heterogeneous ion exchange membrane, which comprises kneading a silane-modified polyolefin resin and ion exchange resin fine powder, forming the resulting mixture into pellets, extruding to form a film and then subjecting the resulting film to a treatment with hot water. According to the process of the present invention, a heterogeneous ion exchange membrane having a high ion transport number in a high ion concentration and a low specific resistance in an aqueous solution of a polyvalent ion salt can be produced or mass-produced on a commercial scale and with a large area.

The process of the present invention will further be illustrated in detail.

The finely powdered ion exchange resin used in the present invention is not particularly limited with respect to the variety and grain size, but a fine powder passing through a sieve of about 325 mesh is preferably used. For example, the following ion exchange materials are used.

(A) Finely powdered cation exchange materials (1) An aromatic compound having vinyl group capable of accepting readily a cation exchange group and a compound having in the molecule two or more unsaturated bonds polymerizable therewith are subjected to suspension copolymerization in an aqueous medium and the resulting bead-shaped copolymer is treated with a sulfonating agent, followed by finely powdering mechanically.

(2) An aromatic compound having vinyl group capable of accepting readily a cation exchange group and a compound having in the molecule two or more unsaturated bonds polymerizable therewith are subjected to emulsion copolymerization in an aqeuous medium and the resulting finely powdered copolymer is treated with sulfonating agent.

(3) A cation exchange resin consisting essentially of a phenol compound/formaldehyde condensate is finely ground mechanically.

Examples of the aromatic compound having vinyl group capable of accepting readily a cation exchange group, which can be used herein, are styrene, vinyltoluene, ethylvinylbenzene, α-methylstyrene, vinyl naphthalene and derivatives thereof. These compounds can be used individually or in combination.

As the compound having in the molecule two or more unsaturated bonds copolymerizable therewith there is generally used divinylbenzene.

(B) Finely powdered anion exchange materials (1) An epihalohydrin compound, amine compound and polyepoxy compound are reacted and hardened and the resulting hardened epoxyamine condensate is finely powdered mechanically. Examples of the epihalohydrin compound are epichlorohydrin and β-methylepichlorohydrin and examples of the polyepoxy compound are bisphenol type epoxy resins (e.g. diglycidyl of bisphenol A), novolak type epoxy resins (e.g. polyglycidyl ether of phenol-formaldehyde novolak), polyphenol type epoxy resins (e.g. tetraglycidyl ether of tetraphenylene ethane), polyglycol type epoxy resins (e.g. triglycidyl ether of glycerine), carboxylic acid type epoxy resins (e.g. glycidyl ester of phthalic acid), amine type epoxy resins (e.g. glycidylaniline) and alicyclic epoxy resins (e.g. vinylcyclohexene epoxide). These materials can be used individually or in combination.

(2) An epihalohydrin compound and imidazole, as described in Japanese Patent Application No. 68861/1976, are reacted and the resulting modified imidazole is reacted with a polyepoxy compound and hardened, followed by finely powdering. As the epihalohydrin and polyepoxy compound there are used those set forth above (1).

(3) A bridging copolymer having a group reactive with the imidazoles described in Japanese patent application No. 68862/1976 (e.g. copolymer of chloromethylstyrene-styrene-divinylbenzene) is reacted with the imidazole and the resulting reaction product is treated with an epoxy compound to obtain an ion exchange resin, which is then ground mechanically. The epoxy compound used herein means that having at least one oxirane ring.

(4) An aromatic compound having vinyl group capable of accepting readily an anion exchange group and a compound having in the molecule two or more unsaturated bonds polymerizable therewith are subjected to suspension copolymerization in an aqueous medium and the resulting bead-shaped copolymer is chloromethylated and aminated to obtain a bead-shaped anion exchange resin, followed by finely powdered.

Examples of the aromatic compound having vinyl group capable of accepting readily an anion exchange group, which can be used herein, are styrene, vinyltoluene, ethylvinylbenzene, α-methylstyrene, vinylnaphthalene and derivatives thereof. These compounds can be used individually or in combination.

As the compound having in the molecule two or more unsaturated bonds copolymerizable therewith there is generally used divinylbenzene.

(5) An anion exchange resin consisting essentially of a phenol compound/formaldehyde condensate is finely ground mechanically.

As the silane-modified polyolefin resin of the present invention there are generally used silane-grafted polyolefin resins, vinylsilane-copolymerized polyolefin resins and the like, examples of which are as follows:

(1) Silane-grafted polyolefin resins

These resins can be prepared by reacting a polyolefin such as polyethylene or a copolymer of ethylene with a small proportion of propylene and/or butylene with a silane represented by the general formula $RR'SiY_2$ in which R is an olefinically unsaturated monovalent hydrocarbon group or unsaturated hydrocarbyloxy group, each Y is a hydrolyzable organic group and R' is a monovalent hydrocarbon group or the group Y in the presence of a free radical producing compound.

In typical examples of the unsaturated silane compound, R is vinyl, allyl, isopropenyl, butenyl or cyclohexenyl, Y is methoxy, ethoxy, formyloxy, acetoxy, propionoxy, alkyl or arylamino, and R' is methyl, ethyl, propyl, decyl or phenyl. Particularly preferable unsaturated silane compounds are represented by the following general formula,

$$CH_2=CHSi(OA)_3$$

in which A is a hydrocarbon group with 1 to 8 carbon atoms, preferably 1 to 4 carbon atoms. Most preferably, vinyltriethoxysilane and vinyltrimethoxysilane are used.

As the free radical producing compound used in the reaction of a polyolefin and unsaturated silane there are given organic peroxides, peresters and azocompounds and above all, dicumyl peroxide is preferably used.

(2) Vinylsilane-copolymerized polyolefin resins

In the copolymerization, the above described silanes and olefins such as ethylene or mixtures of ethylene as a predominant component and propylene and/or butene are copolymerized. The copolymerization is carried out, for example, in the presence of a radical polymerization initiator under a pressure of 1000 to 4000 kg/cm² at a temperature of 100° to 400° C. The modification with such a silane should preferably be carried out so as to incorporate 0.2 to 15% by weight of the silane compound unit in any case of the silane-grafted polyolefin resins and vinylsilane-copolymerized polyolefin resins.

The silane-modified polyolefin resins are preferably used in admixture with other polyolefins and, in general, 0.5 to 5 parts by weight of polyethylene or polypropylene is added to 1 parts by weight of the silane-modified polyolefin resin. During the same time, it is desirable to adjust the content of the silane compound unit in the blended polymer to 0.1 to 10% by weight. Other additives such as fillers, foaming agents, stabilizers and colorants can be added.

In the present invention, furthermore, suitable lubricants such as metallic soaps, fatty acid amides, fatty acid esters and low molecular weight polyolefins can be used for the purpose of enabling an ion exchange resin and silane-modified polyolefin resin to be extruded. In particular, a low molecular weight polyethylene is preferable from such a point of view that bridging of a matrix polymer is not retarded. A low molecular weight polyethylene wax having a mean molecular weight of 500 to 5000 is generally used which can ordinarily be obtained as a polymer of ethylene using a Ziegler type catalyst in the presence of a molecular weight regulator or as a byproduct, extract or thermally cracked product of polyethylene.

The mixing ratio of an ion exchange resin to the above described silane-modified polyolefin resin is generally 75:25 to 25:75 by weight, preferably 70:30 to 30:70 by weight, and the quantity of a lubricant, suitable for film making, is 0.1 to 10 parts by weight to 100 parts by weight of a mixture of an ion exchange resin and silane-modified polyolefin resin.

The film making is for example carried out as follows: A mixture of a powdered or granular silane-modified polyolefin resin, ion exchange resin and lubricant is previously kneaded at a temperature at which the silane-modified polyolefin resin is plasticized or preferably fused by means of an ordinary fusing and kneading apparatus such as kneader or mixing roll, and preferably formed into pellets. The thus resulting pellets, as a starting material to be extruded, are fed to an extruder provided with an ordinary T-die to form a film-shaped article.

If necessary, a silanol condensation catalyst, as described hereinafter, can be added to the extruder at this stage, but, in general, the addition thereof is preferably carried out after the membrane is formed, so as to control the property of the membrane. At this time, the film-shaped article is preferably subjected to rolling with heating at 50° to 150° C. The film thickness is optional, but in general, it is approximately 0.1 to 1.0 mm.

The film-shaped article produced in this way is further subjected to a post-treatment with hot water at 50° C. or higher to effect the bridging reaction of the silane-modified polyolefin resin and to obtain the property as an ion exchange membrane. The post-treatment is carried out by holding the film-shaped article in hot water at 60° C. or higher, preferably 70° C. or higher for 20 minutes or more, preferably 30 to 120 minutes. For the purpose of effecting the bridging reaction smoothly, a silanol condensation catalyst such as dibutyltin dilaurate, stannous acetate, stannous octoate, lead naphthenate or isopropyl orthotitanate can be added to the system or caused to be coexistent before or during the treatment with hot water. In the case of adding a silanol condensation catalyst before the treatment with hot water, a membrane-shaped article is immersed in a solvent, for example, toluene, xylene, benzene, etc. containing the catalyst in a proportion of 0.1~10% by weight for 30 minutes to 10 hours. The treatment with hot water serves to effect the bridging reaction as well as to form microcracks to give the property as an ion exchange membrane. When it is necessary to control the formation of microcracks, an electrolyte such as alkali metal salt or ammonium salt can be added to hot water. The quantity of an electrolyte to be added to hot water should preferably be at most 10% by weight. When no electrolyte is added, changes of the specific resistance and ion transport number with the passage of time are rather decreased. Examples of this salt are sodium chloride, sodium carbonate, sodium sulfate, sodium acetate, potassium chloride and ammonium sulfate.

According to the process of the present invention, there can be obtained a heterogeneous ion exchange membrane having a high ion transport number in a high ion concentration as well as a low specific resistance in an aqueous solution of polyvalent ion salt with a large area, which is suitable for desalting an aqueous salt solution containing a number of polyvalent ions.

In the heterogeneous ion exchange membrane of the present invention, the matrix has a bridged structure and the molecular chains are entangled each other, so that the resistance to the swelling pressure of the ion exchange resin is large and the stress concentration points are hardly formed in the inner part. Therefore, it is assumed that microcracks with a small diameter are evenly formed therein to give a high ion transport number in a high salt concentration. However, it has not been made clear yet why the specific resistance in an aqueous solution of a polyvalent ion salt is improved.

The present invention will further be illustrated in greater detail in the following examples and comparative examples. It will be self-evident to those skilled in the art that the ratios ingredients in the formulations and the order of operations can be modified within the scope of the present invention. Therefore, the present invention is not to be interpreted as being limited to the following examples. All parts, percents and the like are to be taken as those by weight, unless otherwise indicated.

EXAMPLE 1

8 parts of divinylbenzene with a purity of 55% was added to 92 parts of styrene monomer, subjected to suspension copolymerization using benzoyl peroxide as catalyst to obtain a granular copolymer and then sulfonated with oleum, thus obtaining a strongly acidic cation exchange resin. The thus resulting strongly acidic cation exchange resin was ground to a grain size of 325 mesh or less (Tyler) by means of a vibrating mill to obtain a cation exchange resin (A) having a strongly acidic exchange capacity of 4.0 meq/g on dry base.

A mixture of 60 parts of the above described cation exchange resin (A) powder, 10 parts of a silane-grafted polyethylene obtained by mixing 100 parts of high density polyethylene with MI=5, 2.0 parts of vinyltrimethoxysilane and 0.1 part of dicumyl peroxide and granulating at 180° C. through an extruder, 30 parts of high density polyethylene with MI=5 and 3 parts of a polyethylene wax (manufactured by Sanyo Kasei Co., Commercial Name=Sanwax 171P) was kneaded for about 30 minutes in a mixing roll heated at 180° C. and formed into pellets by the sheet cutting method. The pellets were extruded through an extruder (50 φ) provided with an ordinary T-die, formed into a film-shaped article with a width of 600 mm by the use of a sheeting die and then cooled and solidified between three rolls heated at 90° C. to obtain a membrane. This membrane was immersed in hot water at 95° C. for 100 minutes, thus obtaining a cation exchange membrane having a thickness, ion transport number in NaCl water and in $CaCl_2$ water and specific resistance in NaCl water and in $CaCl_2$ water, as shown in Table 1.

Comparative Example 1

A mixture of 60 parts of the cation exchange resin (A) powder, 40 parts of high density polyethylene with MI=5 and 3 parts of a polyethylene wax (Sanwax 171 P) was kneaded and extruded in an analogous manner to Example 1. The resulting film-shaped article was subjected to irradiation of electron beam with a dosage of 30 MRAD and then immersed in hot water at 90° C. for 40 minutes to thus obtain a cation exchange membrane having the properties as shown in Table 1. The specific resistance in an aueous solution of a divalent ion salt, i.e. $CaCl_2$ was higher.

FIG. 1 shows graphically the relation of the specific resistance and $Ca^{++}$ equivalent fraction in solution of the cation exchange membrane (A) (Example 1) and (B) (Comparative Example 1) in an aqueous solution of a mixed salt of NaCl—$CaCl_2$.

A mixture of 60 parts of the above described anion exchange resin (B) powder, 10 parts of a silane-grafted polyethylene obtained by mixing 100 parts of high density polyethylene with MI=5, 1.0 part of vinyltrimethoxysilane and 0.05 part of dicumyl peroxide and granulating through an extruder at 180° C., 30 parts of high density polyethylene with MI=5 and 3 parts of polyethylene wax (Sanwax 171 P) was kneaded, extruded and subjected to a treatment with hot water in an analogous manner to Example 1, thus obtaining an anion exchange membrane having a membrane thickness, transport number in NaCl water and in $Na_2SO_4$ water and specific resistance in NaCl water and in $Na_2SO_4$ water, as shown in Table 2.

COMPARATIVE EXAMPLE 2

A mixture of 60 parts of the anion exchange resin (B) powder, 40 parts of high density polyethylene with an MI of 5 and 3 parts of a polyethylene wax (Sanwax 171 P) was kneaded and extruded in an analogous manner to Example 1. The resulting film-shaped article was subjected to irradiation of electron beam with a dosage of 20 MRAD and the immersed in hot water at 95° C. for 40 minutes to thus obtain an anion exchange membrane having the properties as shown in Table 2. The specific resistance in an aqueous solution of a divalent ion salt, i.e. $Na_2SO_4$ was not good.

Figure 2:
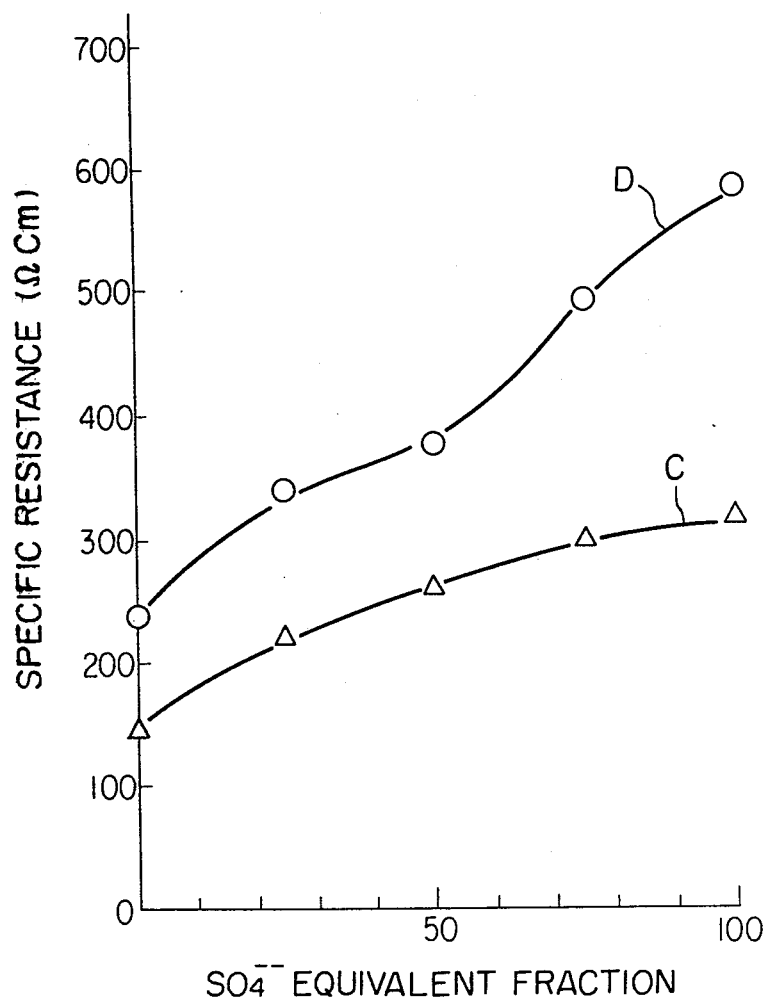

FIG. 2 shows graphically the relation of the specific resistance and $SO_4^{--}$ equivalent fraction in solution of the anion exchange membrane (C) (Example 2) and (D) (Comparative Example 2) in an aqueous solution of a mixed salt of NaCl-$Na_2SO_4$.

TABLE 2

| | Membrane Thickness (mm) | Ion Transport Number in NaCl Water | Ion Transport Number in $Na_2SO_4$ Water | Specific Resistance in NaCl Water (Ωcm) | Specific Resistance in $Na_2SO_4$ Water (Ωcm) |
|---|---|---|---|---|---|
| Example 2 | 0.35 | 0.92 | 0.88 | 150 | 320 |
| Comparative Example 2 | 0.36 | 0.92 | 0.88 | 230 | 590 |

In these examples, the ion transport number was calculated by partitioning aqueous electrolyte solutions with a concentration of 0.5 N and 0.005 N by a membrane and measuring the membrane potential generated between both the aqueous solutions through the membrane, and the specific resistance was represented by the electric resistance of the membrane (Ωcm) when an alternating current of 1000 cycles was passed in an aqueous solution of an electrolyte with a concentration of 0.5 N.

TABLE 1

| | Membrane Thickness (mm) | Ion Transport Number in NaCl Water | Ion Transport Number in $CaCl_2$ Water | Specific Resistance in NaCl Water (Ωcm) | Specific Resistance in $CaCl_2$ Water (Ωcm) |
|---|---|---|---|---|---|
| Example 1 | 0.35 | 0.91 | 0.88 | 230 | 490 |
| Comparative Example 1 | 0.36 | 0.92 | 0.87 | 270 | 670 |

EXAMPLE 2

284 parts of epichlorohydrin was reacted with 236 parts of imidazole to obtain an initial condensate. 448 parts of Epikote 828 (manufactured by Shell Chemical Co., Commercial Name, WPE=180) and 32 parts of Epikote 154 (manufactured by Shell Chemical Co., Commercial Name, WPE=180) were added thereto, mixed adequately and heated and hardened at 170° C. for 20 hours, thus obtaining an anion exchange resin. The anion exchange resin was ground to a grain size of 325 mesh or less by means of a vibrating mill to obtain an anion exchange resin (B) having a salt splitting capacity of 1.8 meq/g on dry base and a total ion exchange capacity of 2.6 meq/g on dry base.

EXAMPLE 3

A mixture of 58 parts of the cation exchange resin (A) powder, 13 parts of a silane—grafted polyethylene obtained by mixing 100 parts of high density polyethylene with MI=5, 2.5 parts of vinyltriethoxysilane and 0.1 part of dicumyl peroxide and granulating at 180° C. through an extruder, 29 parts of high density polyethylene with MI=5 and 3 parts of a polyethylene wax (manufactured) by Sanyo Kasei Co., Commercial Name=Sanwax 171 P) was kneaded, extruded and subjected to a treatment with hot water in an analogous manner to Example 1, thus obtaining a cation exchanging membrane having the properties as shown in Table 3:

TABLE 3

|  | Membrane Thickness (mm) | Ion Transport Number in NaCl Water | Ion Transport Number in CaCl$_2$ Water | Specific Resistance in NaCl Water ($\Omega$cm) | Specific Resistance in CaCl$_2$ Water ($\Omega$cm) |
|---|---|---|---|---|---|
| Example 3 | 0.35 | 0.91 | 0.88 | 220 | 500 |

EXAMPLE 4

A mixture of 60 parts of the anion exchange resin (B) powder, 12 parts of an ethylene-propylene-vinyltrimethoxysilane copolymer obtained by polymerizing 100 parts of ethylene, 2.3 parts of propylene and 0.7 part of vinyltrimethoxy silane at a temperature of 220° C. and a pressure of 2400 kg/cm$^2$ in the presence of 0.003 part of t-butyl peroxisobutyrate, 28 parts of low density polyethylene with MI=4 and 3 parts of a polyethylene wax (Sanwax 171 P) was kneaded and extruded in an analogous manner to Example 1. The thus resulting membrane-shaped article was immersed in hot water at 85° C. for 100 minutes to obtain an anion exchange membrane having the properties as shown in Table 4:

TABLE 4

|  | Membrane Thickness (mm) | Ion Transport Number in NaCl Water | Ion Transport Number in Na$_2$SO$_4$ Water | Specific Resistance in NaCl Water ($\Omega$cm) | Specific Resistance in Na$_2$SO$_4$ Water ($\Omega$cm) |
|---|---|---|---|---|---|
| Example 4 | 0.34 | 0.93 | 0.89 | 160 | 310 |

What is claimed is:

1. A process for the production of a heterogeneous ion exchange membrane in which an ion exchange resin fine powder is dispersed in a thermoplastic resin, which process comprises kneading a silane-modified polyolefin resin selected from the group consisting of silane-grafted polyolefin resins and vinylsilane-copolymerized polyolefin resins, and an ion exchange resin fine powder, extruding the mixture to form a membrane and then subjecting the resulting membrane to a treatment with hot water.

2. The process as claimed in claim 1, wherein the mixture is formed into pellets before the extrusion.

3. The process as claimed in claim 1, wherein the silane-grafted polyolefin resin is prepared by reacting a polyolefin with a silane represented by the general formula RR'SiY$_2$ in which R is an olefinically unsaturated monovalent hydrocarbon group of unsaturated hydrocarbyloxy group, each Y is a hydrolysable organic group and R' is a monovalent hydrocarbon group or the group Y in the presence of a free radical producing compound.

4. The process as claimed in claim 3, wherein the polyolefin is selected from the group consisting of polyethylene and copolymers of ethylene with a small proportion of propylene and/or butylene.

5. The process as claimed in claim 1, wherein the vinylsilane-copolymerized polyolefin resins are copolymers of silanes and olefins.

6. The process as claimed in claim 5, wherein the silanes are represented by the general formula RR'SiY$_2$ in which R, R' and Y have the same meanings as above.

7. The process as claimed in claim 5, wherein the olefins are selected from the group consisting of ethylene and comonomers of ethylene with propylene and/or butylene.

8. The process as claimed in claim 3, wherein the silane is represented by the general formula CH$_2$=CHSi(OA)$_3$ in which A is a hydrocarbon group with 1 to 8 carbon atoms.

9. The process as claimed in claim 6, wherein the silane is represented by the general formula CH$_2$=CHSi(OA)$_3$ in which A has the same meaning as above.

10. The process as claimed in claim 1, wherein the silane-modified polyolefin resin contains 0.2 to 15% by weight of a silane compound unit.

11. The process as claimed in claim 1, wherein the silane-modified polyolefin is kneaded with an ion exchange resin fine powder in a proportion of 75:25 to 25:75 by weight.

12. The process as claimed in claim 1, wherein the silane-modified polyolefin resin is used in admixture with a polyolefin resin.

13. The process as claimed in claim 12, wherein the polyolefin resin is selected from the group consisting of polyethylene and polypropylene.

14. The process as claimed in claim 12, wherein the mixing ratio of the polyolefin is 0.5 to 5 parts by weight to 1 part by weight of the silane-modified polyolefin.

15. The process as claimed in claim 11, wherein the blended polymer contains 0.1 to 10% by weight of a silane compound unit.

16. The process as claimed in claim 1, wherein a lubricant is used for the extrusion of the ion exchange resin fine powder and silane-modified polyolefin resin.

17. The process as claimed in claim 16, wherein the lubricant is selected from the group consisting of metallic soaps, fatty acid amides, fatty acid esters and low molecular weight polyolefins.

18. The process as claimed in claim 17, wherein the low molecular weight polyolefin is a low molecular weight polyethylene wax having a mean molecular weight of 500 to 5000.

19. The process as claimed in claim 16, wherein a lubricant is in a proportion of 0.1 to 10 parts by weight to 100 parts by weight of the mixture of silane-modified polyolefin resin and ion exchange resin.

20. The process as claimed in claim 1, wherein the extruded membrane is subjected to rolling with heating at a temperature of 50° to 50° C.

21. The process as claimed in claim 1, wherein the treatment with hot water is carried out at a temperature of at least 50° C.

22. The process as claimed in claim 1, wherein the treatment with hot water is carried out by holding the membrane in hot water at a temperature at least 60° C. for at least 20 minutes.

23. The process as claimed in claim 1, wherein the hot water contains a silanol condensation catalyst.

24. The process as claimed in claim 23, wherein the silanol condensation catalyst is selected from the group consisting of dibutyltin dilaurate, stannous acetate, stannous octoate, lead naphthenate and isopropyl orthotitanate.

25. The process as claimed in claim 1, wherein the hot water contains an electrolyte.

26. The process as claimed in claim 25, wherein the electrolyte is selected from the group consisting of sodium chloride, sodium carbonate, sodium sulfate, sodium acetate, potassium chloride and ammonium sulfate.

* * * * *